United States Patent
Wang (10) Patent No.: US 9,462,535 B2
(45) Date of Patent: Oct. 4, 2016

(54) METHOD, APPARATUS AND SYSTEM FOR OBTAINING ERROR CODE INFORMATION

(71) Applicant: ZTE Corporation, Shenzhen (CN)

(72) Inventor: Yishan Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/422,258

(22) PCT Filed: Jul. 25, 2013

(86) PCT No.: PCT/CN2013/080118
§ 371 (c)(1),
(2) Date: Feb. 18, 2015

(87) PCT Pub. No.: WO2013/178171
PCT Pub. Date: Dec. 5, 2013

(65) Prior Publication Data
US 2015/0223142 A1 Aug. 6, 2015

(30) Foreign Application Priority Data
Aug. 23, 2012 (CN) .......................... 2012 1 0301934

(51) Int. Cl.
*H04W 40/24* (2009.01)
*H04W 48/02* (2009.01)
(Continued)

(52) U.S. Cl.
CPC ........... *H04W 40/248* (2013.01); *H04W 24/08* (2013.01); *H04W 48/02* (2013.01); *H04W 68/00* (2013.01); *H04W 76/027* (2013.01); *H04W 24/04* (2013.01)

(58) Field of Classification Search
CPC . H04W 24/08; H04W 24/04; H04W 40/248; H04W 48/02; H04W 68/00; H04W 76/027

USPC .......................................................... 455/425
See application file for complete search history.

(56) References Cited

U.S. PATENT DOCUMENTS 5,774,650 A * 6/1998 Chapman et al. ................. 726/7
6,954,854 B1 * 10/2005 Miura et al. ................... 713/168
(Continued)

FOREIGN PATENT DOCUMENTS

| CN | 1863206 A | 11/2006 |
|---|---|---|
| CN | 101150472 A | 3/2008 |

(Continued)

OTHER PUBLICATIONS

International Search Report for corresponding application PCT/CN2013/080118 filed Jul. 25, 2013; Mail date Oct. 17, 2013.
(Continued)

*Primary Examiner* — Leon Flores
(74) *Attorney, Agent, or Firm* — Cantor Colburn LLP (57) ABSTRACT

A method for obtaining error code information is provided The method includes: a mobile terminal receives a first message, wherein the first message is sent to the mobile terminal from a network side after the mobile terminal fails to access a network, and the first message includes error code information used for identifying the reason why the mobile terminal failed to access the network; the mobile terminal obtains and displays the cause of the network access failure, thereby being able to quickly and accurately obtain the reason why the mobile terminal failed to access the network, and provide a response prompt to a user, and thereby being able to intelligently and quickly assist the user to interact well with the mobile terminal, and the user experiences are improved.

7 Claims, 6 Drawing Sheets

(51) Int. Cl.
*H04W 76/02* (2009.01)
*H04W 24/08* (2009.01)
*H04W 68/00* (2009.01)
*H04W 24/04* (2009.01)

(56) References Cited

U.S. PATENT DOCUMENTS

| | | | |
|---|---|---|---|
| 7,437,457 B1 * | 10/2008 | Eisendrath et al. | 709/225 |
| 7,467,400 B1 * | 12/2008 | Moss et al. | 726/3 |
| 2001/0052018 A1 * | 12/2001 | Yokokura | 709/229 |
| 2007/0004398 A1 | 1/2007 | Juan | |
| 2009/0254658 A1 | 10/2009 | Kamikura | |

FOREIGN PATENT DOCUMENTS

| | | |
|---|---|---|
| CN | 101272319 A | 9/2008 |
| CN | 101577963 A | 11/2009 |
| CN | 102833782 A | 12/2012 |
| WO | 2005048631 A1 | 5/2005 |

OTHER PUBLICATIONS

European Search Report for corresponding application EP 13 79 7197; Reported dated Jul. 16, 2015.

* cited by examiner

METHOD, APPARATUS AND SYSTEM FOR OBTAINING ERROR CODE INFORMATION

TECHNICAL FIELD

The present invention relates to the technical field of communications, and in particular to a method, apparatus and system for obtaining error code information.

BACKGROUND

With the development of wireless communication technologies, wireless mobile terminals are more and more widely used in people's lives; at the same time, global mobile operator networks are also developing rapidly, and access and processing between the terminals and numerous and complicated networks cause a series of prominent problems, especially after the access is failed between the mobile terminals and the networks, response and processing manner of the mobile terminals determine the performance and usability of the mobile terminals to a large extent, and visually affect the user experience.

For a mobile terminal, when registering a network or dialling for connection, it is often refused by the network for some reason, causing registration or networking to be failed. There are many reasons for registration failure, for example: a network not allowing roaming, not finding a suitable cell, not storing International mobile subscriber identification code and so on; besides, for a mobile terminal of a wireless data type, dialling for networking is a widely-used function, and when the mobile terminal accesses a network, dialling for networking is often failed, and reasons are various: P domain attachment failure, packet data protocol (Packet Data Protocol, referred to as PDP) activation failure, the port being occupied, etc. Moreover, during normal use of the mobile terminal, events of network de-attachment or disconnecting networking also occur due to various reasons, such as due to the movement of the mobile terminal attempting to register the roaming network being denied, or disconnecting a PDP connection due to network reasons, and these are all non-normal states of the mobile terminal interacting with the network.

At present, with regard to the non-normal state met in the interacting process of the above-mentioned mobile terminal and the network, the processing of the mobile terminal has many problems.

For example, when the mobile terminal fails to register a network, the mobile terminal merely displays to the user through a "no service" or "no signal" and other prompts, but does not describe the specific reasons of the failure, and also does not perform prompt description for a next operation. Under this situation, although the reasons of the failure are usually due to objective factors, such as the network; however, a user would easily misunderstand functions and performance of the terminal, and have the impression of the terminal being of bad performance and inconvenience in use.

For another example, after dialling for networking is failed, the mobile terminal also merely displays "networking being failed" to a user, and does not give the user any prompt for a next execution operation. Such a processing result not only causes a user to misunderstand the performance of the mobile terminal, but also decreases interaction between the mobile terminal and the user.

Besides, if the mobile terminal fails to register the network or continuously fails to perform networking for several times because of non-functional, performance reasons, it will bring very bad impression to the user who will complain constantly, which will eventually affect the reputation of the mobile terminal.

In addition, even if in the case of the mobile terminal being normally used, because of the reasons of switching or signals, the event of the terminal and the network being disconnected also often occurs, and the user has no method for processing the situation, which will severely affect a next operation and usage.

Then it can be seen that in the prior art, in the interaction process between the mobile terminal and the network, if a abnormal state occurs, i.e., the mobile terminal fails to access the network, the mobile terminal could not provide explicit information and response prompt for the reason of the failure, which will cause the mobile terminal to be of bad usability and not facilitate interaction of the user and the mobile terminal.

SUMMARY

The present invention provides a method, apparatus and system for obtaining error code, which can quickly and accurately obtain the reason why the mobile terminal failed to access the network, and provide a response prompt to a user, and thereby being able to intelligently and quickly assist the user to interact well with the mobile terminal, and improve the user experience of the mobile terminal.

The present invention provides a solution as follows:

an embodiment of the present invention provides method for obtaining error code information, the method includes:

a mobile terminal receives a first message, the first message being sent to a mobile terminal by a network side after the mobile terminal fails to access a network, the first message includes error code information, the error code information being used for identifying the reason why the mobile terminal failed to access the network;

the mobile terminal obtains the cause of failure to access the network; and the mobile terminal displays the cause of failure to access the network.

Preferably, before the mobile terminal receives the first message, the method further includes:

after failing to access the network, the mobile terminal sending a query message to a network side to query the cause of failure to access the network.

Preferably, the mobile terminal obtaining the cause of failure to access the network includes:

the mobile terminal parses the error code information in the first message, and obtains the cause of the network access failure included in the first message;

the mobile terminal packages the cause of the network access failure into a second message to make it is suitable for transmission inside the mobile terminal;

the mobile terminal performs an inner transmission on the second message via an inner transmission channel; and the mobile terminal parses the second message after the inner transmission, and obtains the cause of the network access failure included in the second message.

Preferably, the type of the second message is regulated by the current operation system and/or by the hardware protocol of the mobile terminal, and the inner transmission channel is the channel provided by the current operation system and/or by the hardware of the mobile terminal.

Preferably, the mobile terminal displays the cause of the network access failure includes:

the mobile terminal prompt a response which can be taken to deal with the network access failure.

An embodiment of the present invention further provides apparatus for obtaining error code information, the apparatus includes:

a receiving module is configured to receive a first message, wherein the first message is sent to a mobile terminal by a network side after the mobile terminal fails to access a network, the first message includes error code information, the error code information being used for identifying the reason why the mobile terminal failed to access the network;

an obtaining module is configured to obtain the cause of the network access failure; and a displaying module is configured to display the cause of the network access failure.

Preferably, the apparatus further includes:

a query module is configured to, after failing to access the network, send a query message to a network side to query the cause of the network access failure Preferably, the obtaining module includes:

a first parsing unit is configured to parse error code information in the first message and obtain the cause of the network access failure included in the first message;

a packaging unit is configured to package the cause of the network access failure into a second message to make it is suitable for transmission inside the mobile terminal, and the type of the second message comply with the current operation system and/or hardware protocol of the mobile terminal;

a transmission unit is configured to perform transmission inside the mobile terminal on the second message via an inner transmission channel, and the inner transmission channel is the channel provided by the current operation system and/or hardware of the mobile terminal; and a second parsing unit is configured to receive the second message transmitted by the transmission unit via the inner transmission channel, and parse the second message to obtain the cause of the network access failure included in the second message so as to facilitate the displaying module to display it.

Preferably, the information displayed by the displaying module further includes response prompt which can be taken to handle the network access failure.

An embodiment of the present invention further provides system for obtaining error code information. The system includes a network side device and a mobile terminal.

The network side device is configured to send a first message to the mobile terminal when the mobile terminal failed to access a network, and the first message includes error code information, and the error code information being used for identifying the reason why the mobile terminal failed to access the network; and the mobile terminal is configured to receive the first message, obtain and display the cause of the network access failure.

It can be seen from the above-mentioned that the embodiment of the present invention provides a method, device and system for obtaining error code information: a mobile terminal receives a first message, wherein the first message is sent to the mobile terminal from a network side after the mobile terminal fails to access a network, the first message includes error code information, which is used for identifying the reason why the mobile terminal failed to access the network; the mobile terminal obtains and displays the reason why the mobile terminal failed to access the network, thereby being able to quickly and accurately obtain the reason why the mobile terminal failed to access the network, and provide a response prompt to a user, and thereby being able to intelligently and quickly assist the user to interact well with the mobile terminal, and improve the user experience of the mobile terminal.

DETAILED DESCRIPTION OF EMBODIMENTS

The present disclosure will be described in detail by referring to the accompanying drawings and specific embodiments, to make the objects, technical solutions and advantages of the present disclosure more evident.

Figure 1:
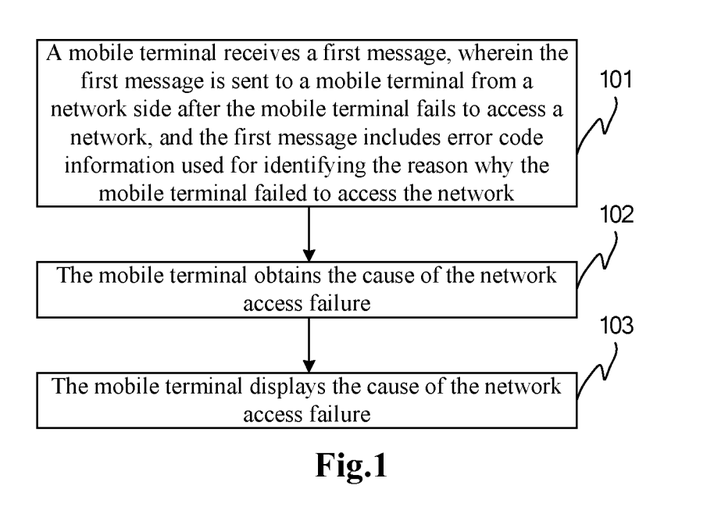
FIG. 1 is a schematic flowchart 1 of a method for obtaining error code information provided by an embodiment of the present invention.

An embodiment of the present invention provides a method for obtaining the error code information, as shown in FIG. 1, the method includes:

step 101, a mobile terminal receives a first message, and the first message is sent to a mobile terminal by a network side after the mobile terminal fails to access a network, and the first message includes error code information, and the error code information is used for identifying a reason why the mobile terminal failed to access the network;

step 102, the mobile terminal obtains the cause of failure to access the network; and step 103, the mobile terminal displays the cause of failure to access the network.

The method for obtaining the error code information provided in the embodiment of the present invention will quickly and accurately obtain the reason why the mobile terminal failed to access the network, thereby being able to intelligently and quickly assist the user to interact well with the mobile terminal, and improve the user experience of the mobile terminal.

In the embodiment of the present invention, after failing to perform an operation of accessing a network, such as registering, attachment or dialling for networking, a mobile terminal may send query information to a network side for querying specific reasons of failing to access the network. After receiving the query information, the network side may according to specific description in protocol, such as 3rd generation partnership project (the 3rd Generation Partnership Project, referred to as 3GPP), collect and parse reason information about error code information, i.e. a mobile terminal failing to access the network, and send same to the mobile terminal through air interface message.

Of course, after the mobile terminal fails to access the network, the network side may also automatically send error code information to the mobile terminal, without requiring the mobile terminal to send query information to the network side.

After the mobile terminal receives a message containing the cause of the network access failure which is sent by the network side, the mobile terminal may obtain the cause of the network access failure through parsing same. Then, the mobile terminal may re-package the obtained the cause of the network access failure into a message type suitable for transmission inside the mobile terminal, and perform inner transmission on an inner transmission message through an inner transmission channel (for example, a wireless network card transmitting same to another functional module inside a mobile terminal); another functional module (software or hardware functional modules) inside the mobile terminal parses the inner transmission message again and obtains the cause of the network access failure which is included therein, and eventually displays the information about failing to access the network to a user.

In the embodiment of the present invention, the inner transmission channel may be specifically a channel provided by a current operation system, hardware, etc. of the mobile terminal; however, inner transmission message may be specifically of a message type regulated by a current operation system, hardware protocol of the mobile terminal.

In a specific embodiment, the inner transmission channel related to in the embodiment of the present invention may be a class driver passage in a Win8 operation system currently installed in the mobile terminal; however, inner transmission message type of the mobile terminal related to in the embodiment of the present invention may be a command package packet (CID) command regulated in the Win8 operation system.

The ClassDriver passage means a network card management model which is developed based on communication device class specification (CDC: Communications Devices Class specification) Network Control Model (NCM: Network Control Model) under Windows8 system developed by the Microsoft, and is further development of the network driver interface specification 6.2 (NDIS6.2) and remote network driver interface specification (RNDIS); on the Windows8 system, a wireless network card device supports ClassDriver driver, then driver with the operation system itself may be automatically installed, and the management of networking, short message and telephone directory may be performed by a user interface (UI) with the operation system; at the same time, since CDC NCM network data management is based thereon, the data packet transmission theoretical speed is superior to RNDIS, Ethernet control Model (ECM) and other models.

The CID command means a ClassDriver command packaging packet (Command Identifier) in the software protocol specifications; the Windows8 system provides a driver and management program, and an original equipment manufacturer (OEM) needs to perform adaptation according to protocols regulated by Software, and can process a control command issued by a processing system, thereby realizing installation and usage of the device on the system. The CID command is a control command that may be identified by the Win8 system and regulated by Microsoft protocols with clear format requirements and field length requirements; Win8 system realizes interacting with a mobile terminal by issuing the CID command and obtains parameters and relevant information about a device in the mobile terminal.

In specific implementation, the operation system of the mobile terminal automatically issues a CID control command, and transfers a control field to the mobile terminal via a ClassDriver passage according to a format regulated by the operation system, then it is processed by the mobile terminal; after completion, an obtained result and state are filled and packaged according to a format regulated by the operation system, and then are transmitted to the operation system via the ClassDriver passage.

For example, if the mobile terminal failing to perform network registration, attachment or dial for networking occurs, relevant error code information may be obtained in a non-access layer according to specific contents of the 3GPP protocol, and then is packaged according to format requirements of the CID command, then is sent to the operation system via a ClassDriver passage; a corresponding functional module (such as an UI) in the operation system reads content in a corresponding field and parses and responds same, and finally makes a prompt for a user, thereby intelligently and quickly assist the user to interact well with the mobile terminal.

Through the above-mentioned technical solution, identifying and parsing the error code after network interaction is failed may be realized, and a result may be intercepted by directly using the ClassDriver passage of the operation system, and provided to the UI, which is quickly and accurately, of high instantaneity, and applicable to all terminal products without drivers which are developed under the Windows8 system. The launch of Windows 8 will bring a lot of market share. Therefore, developing mobile terminals adapted to Windows 8 system, performing command adaptation between terminals and Microsoft protocol specification and eventually realizing the application of terminals without drivers on the Windows 8 system have important significance.

Figure 2:
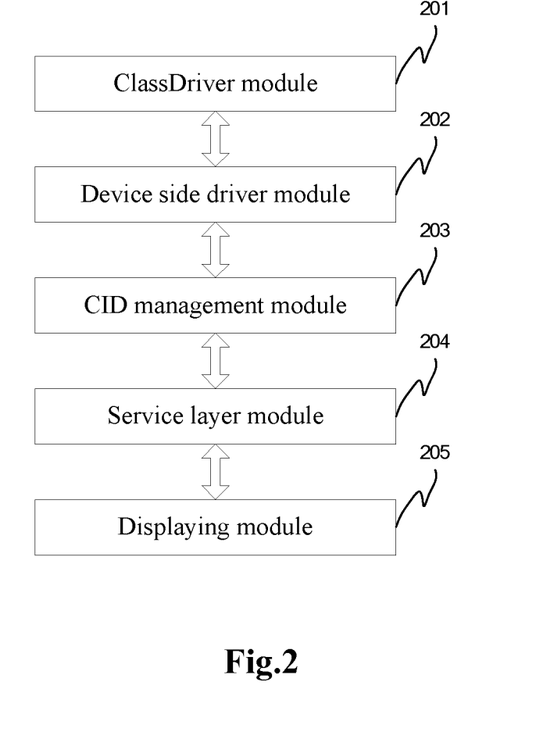
FIG. 2 is a related ClassDriver system function schema diagram in the method for obtaining the error code information provided by an embodiment of the present invention.

The related ClassDriver system function schema diagram in the embodiment of the present invention can be shown in FIG. 2, and may specifically contain five functional modules:

a ClassDriver module 201, being a command control passage under the Windows8 system, configured to transmit control commands issued and received by the OS system;

a device side driver module 202, being responsible for receiving a control command transmitted by the ClassDriver module, then sending same to a CID management module 203, and responsible for receiving a CID processing result sent by the CID management module 203, and sending the result to the ClassDriver module 201;

a CID management module 203, managing the received CID command and CID response, and being responsible for parsing a CID packet transferred by the device side driver module 202, and packaging a CID result transferred by a service layer module 204;

the service layer management module 204, being responsible for processing a specific CID service, and the CID management module 203 distributing and invoking a request, and meanwhile, the service layer management module 204 invoking a result of the CID management module 203, and sending processing information and actively reporting content to the OD management module 203;

a displaying module 205, which may specifically be an application module facing a user, such as an UI and be configured to display terminal state to the user and make information prompt, and the cause of the network access failure obtained by the CID management module 203 in real time.

Moreover, the service layer module 204 may specifically include four types of services commonly used by the mobile terminal, such as Telephone directory, SMS (short message), Register (network registration) and Data (dialling for networking).

However, in another specific embodiment, related inner transmission channel of the mobile terminal in the embodiment of the present invention also may be an information transmission channel provided among hardware devices of the mobile terminal, for example, I/O bus, mainboard information transmission channel, etc., and inner transmission information type also may be any one information type regulated by hardware protocols. Moreover, a built-in processing module, such as CPU, of a mobile terminal re-parses the inner transmission message so as to obtain the cause of failure to access the network.

Of course, related inner transmission channel of the embodiment of the present invention also may be provided by a current operation of the mobile terminal and hardware of the mobile terminal; moreover, inner transmission message type also may be a message type adapted by both the current operation of the mobile terminal and hardware protocols of the mobile terminal.

In addition, while the mobile terminal displays the cause of the network access failure to a user, it may also display a corresponding prompt to the user, for example, if the network being not fluent causes that registering and networking cannot be performed, then the user may be prompted to try later, change a current location, call the service providers, etc., thereby further increasing interaction between the user and the mobile terminal, and improving the experience of the user on the mobile terminal.

The specific application embodiment of the error code information obtaining method provided in the embodiment of the present invention is described in detail separately in the following.

In the following embodiment, inner transmission information of the mobile terminal being a CID control command and inner transmission channel of the mobile terminal being a ClassDriver channel are both taken as examples (merely as examples).

Figure 3:
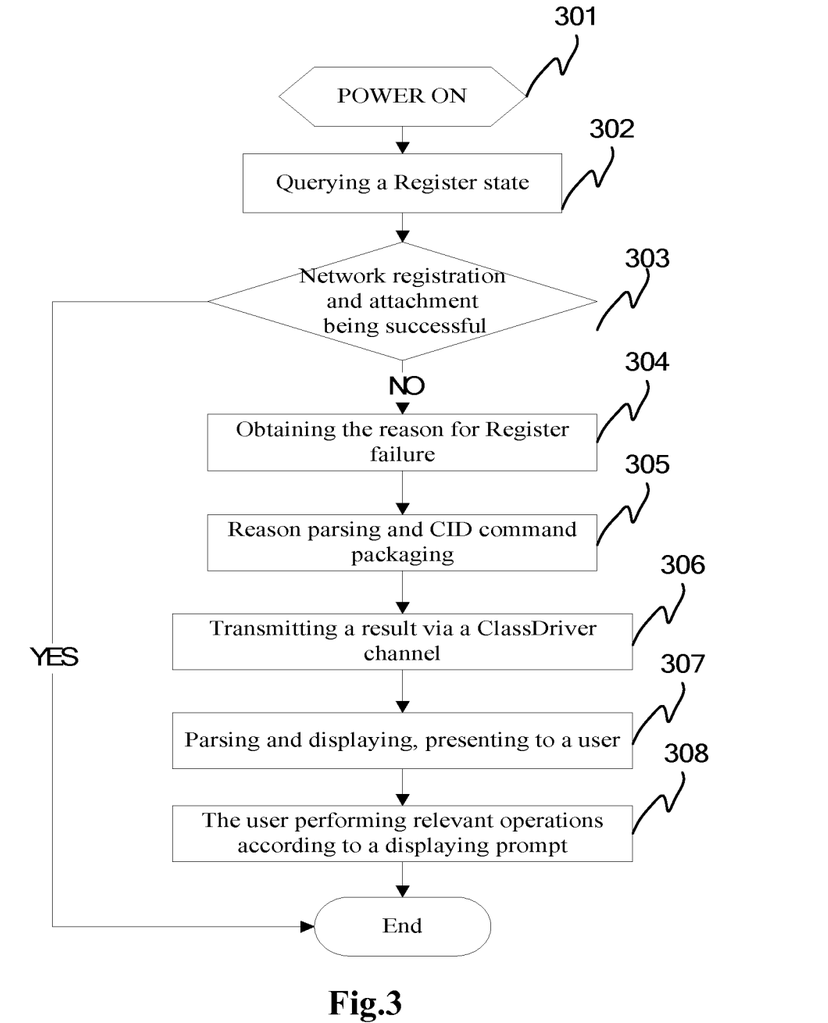
FIG. 3 is a schematic flowchart 2 of the method for obtaining the error code information provided by an embodiment of the present invention.

As shown in FIG. 3, a flow of obtaining error code information about network registration being failed may contain several steps as follows:

step 301: a mobile terminal powers on, performs a series of initialization behaviours, reads information about a user identity card (SIM) and information about a telephone directory, and tries to be stationed on a network.

Step 302: a registration state is queried.

After identifying the device, the operation system automatically issues a CID control command, queries the registration state, transfers a control field to the mobile terminal according to a format regulated by the system via a channel provided by the ClassDriver module 201, and waits the mobile terminal to return a result;

step 303: whether the network registration and attachment being successful is judged.

If the registration is successful, then do not perform processing after obtaining relevant information; and if the registration is failed, then perform next processing according to the description in the present solution.

Step 304: The reason of the network registration being failed is obtained.

The mobile terminal performs error code information query through a Register sub-module of the service layer module 204, and specific contents may be obtained from a network access service (NAS) layer according to the description in 3GPP protocol 24.008.

Step 305: after receiving the error code information sent by a network side, the mobile terminal analyses the reason of the network access failure and obtains the cause of failure to access the network, and re-packages the information about the cause of the network access failure according to a CID command format regulated by Microsoft.

Step 306: after the error code information is packaged into the CID command format, it is transmitted to the CID management module 203 through a channel of the ClassDriver module 201.

Step 307: after receiving the control command, the CID management module 203 parses the error code information, and obtains the cause of the network access failure, and displays the cause in a user interface through a displaying module 205 according to customization requirements, and gives a corresponding response prompt which can be taken to deal with the network access failure.

Step 308: the user performs relevant operation on the mobile terminal according to the contents displayed by the mobile terminal.

The above-mentioned flows realize querying, obtaining, transmitting, parsing and displaying the error code information when the mobile terminal is from powering on to failing to network registration, and guiding a user to perform interaction operations.

Figure 4:
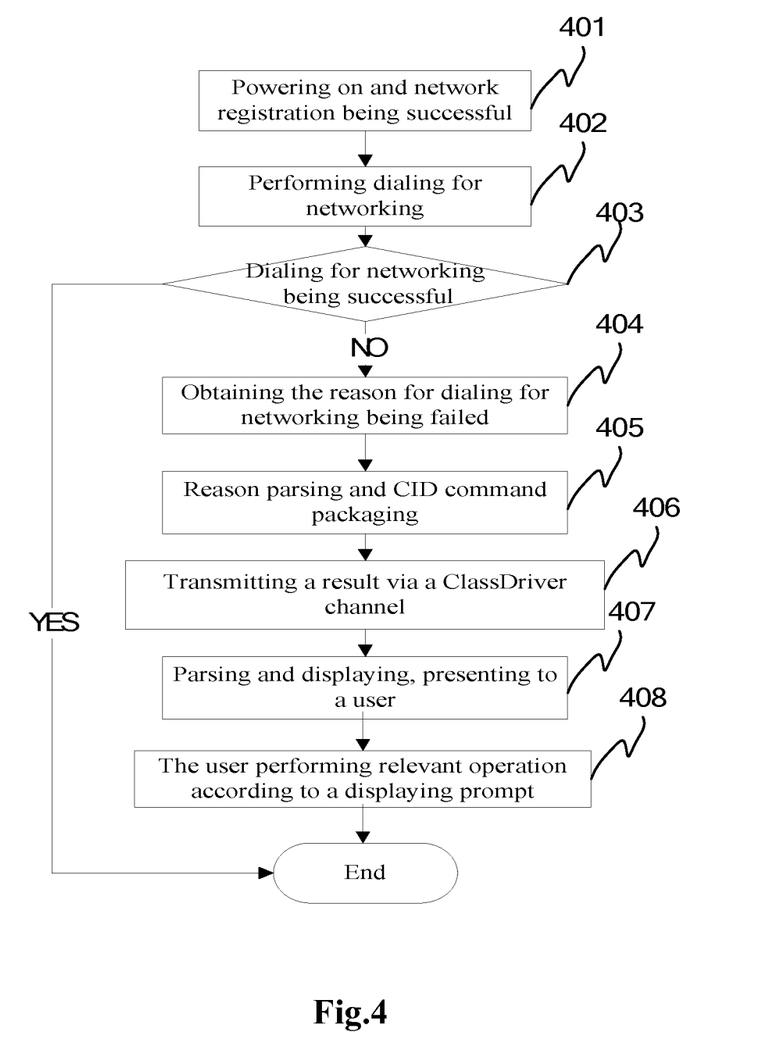
FIG. 4 is a schematic flowchart 3 of the method for obtaining the error code information provided by an embodiment of the present invention.

As shown in FIG. 4, a flow of obtaining error code about dialling form networking being failed may contain several steps as follows:

step 401: a terminal powers on and registers itself with the network successfully, completes a series of processes, such as SIM initialization, public land mobile network (PLMN) selection, cell selection and station, location updating and attachment.

Step 402: The operation of dialling for networking is performed.

The step may be performed by a user manually, and also may be executed by the mobile terminal self initiating through setting "automatically dialling", and is determined by different functions of a data card.

Step 403: whether dialling for networking being successful is judged.

If it is successful, then do not perform processing after obtaining relevant information; and if dialling for networking is failed, then perform next processing according to the description in the present solution.

Step 404: obtaining reasons of dialling for networking being failed.

The mobile terminal may perform error code information query through a Data sub-module of the service layer module 204, and specific contents may be obtained from a NAS layer according to the description in 3GPP protocol 24.008.

Step 405: after receiving the error code information, the mobile terminal performs reason parsing and obtains the cause of failure to access the network, and packages the error code information according to a CID command format regulated by Microsoft.

Step 406: after the error code information is packaged into the CID command format, it is transmitted to the CID management module 203 through a channel provided by the ClassDriver module 201.

Step 407: after receiving the control command, the CID management module 203 parses the command, and obtains the cause of the network access failure, and displays it in a user interface through a displaying module 205 according to customization requirements, and gives a corresponding response prompt.

Step 408: the user performs relevant operation on the mobile terminal according to the contents displayed by the mobile terminal.

The above-mentioned flows realize querying, obtaining, transmitting, parsing and displaying the error code information when the mobile terminal powers on and dialling for networking is failed, and guiding a user to perform interaction operations.

Figure 5:
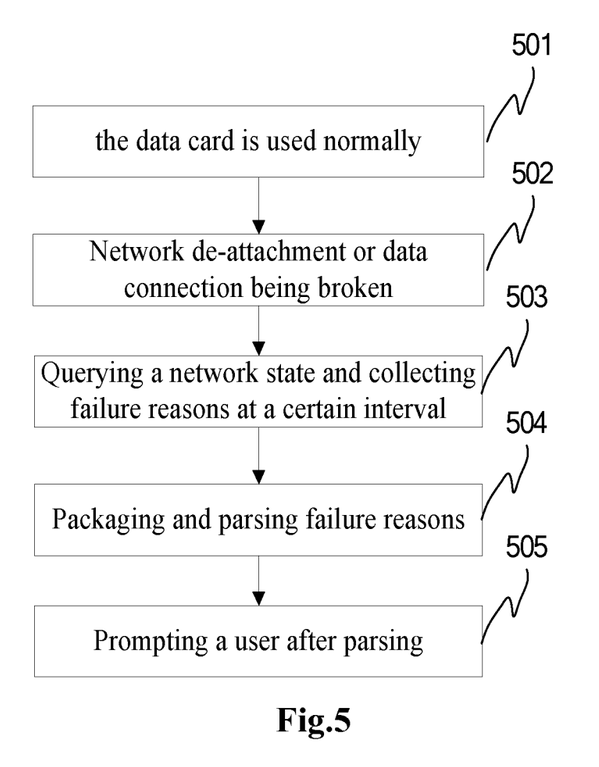
FIG. 5 is a schematic flowchart 4 of the method for obtaining the error code information provided by an embodiment of the present invention.

As shown in FIG. 5, flows of error code obtaining and actively reporting when the mobile terminal is normally used may contain several steps as follows:

step 501: registration and networking situations of the mobile terminal are both normal, and a user is in normal use.

Step 502: under a situation of the mobile terminal being normally used, an event that a data card cannot normally get on the network for use because of network de-attachment or data connection being broken occurs.

Step 503: the CID management module 203 queries a network state at a certain interval through a channel provided by the ClassDriver module 201 according to customized requirements of an operator, if failure event of network de-attachment or data connection being broken is found, then collecting error code information is performed in real time;

step 504: the mobile terminal parses the collected error code information, and packages the cause of the network access failure according to a CID format requirement in Microsoft protocol specifications, and transmits it to the CID management module 203 via a ClassDriver channel;

step 505: after receiving a CID control command, the CID management module 203 parses same, presents same on a user interface according to customization requirements, and gives a further prompt.

The above-mentioned flows realize that under the situation of the mobile terminal is normally used and when an event of network de-attachment or data connection being broken occurs, querying error code information in real time and actively reporting same, and further transmitting, parsing and displaying same, and eventually guiding a user to perform interaction operations.

Figure 6:
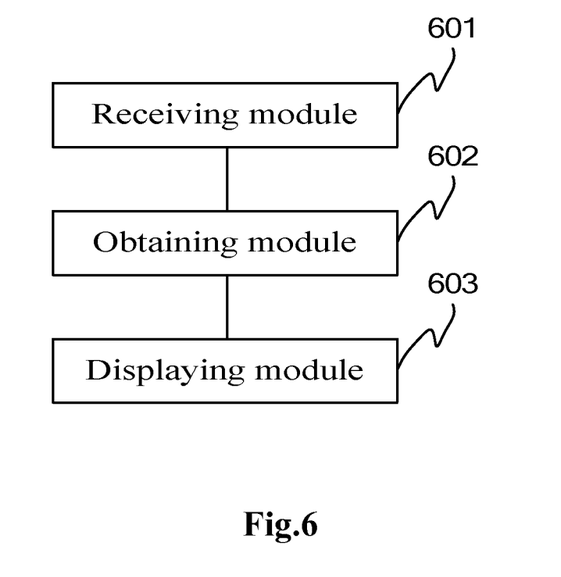
FIG. 6 is a structural schematic diagram of the apparatus for obtaining the error code information provided by an embodiment of the present invention.

An embodiment of the present invention further provides an apparatus for obtaining error code information, as shown in FIG. 6, includes:

a receiving module 601 configured to receive a first message, the first message being sent to a mobile terminal by a network side after the mobile terminal fails to access a network, the first message includes error code information, the error code information being used for identifying the reason why the mobile terminal failed to access the network;

an obtaining module 602 configured to obtain the reason information about failing to access the network; and a displaying module 603 configured to display the reason information about failing to access the network.

In an optional embodiment, the apparatus may further comprise:

a query module configured to, after failing to access the network, send a query message to a network side to query the reason information about failing to access the network.

In an optional embodiment, the obtaining module 602 includes:

a first parsing unit configured to parse error code information in the first message and obtain the reason information about failing to access the network included in the first message;

a packaging unit configured to package the reason information obtained by the first parsing unit and about failing to access the network into a second message suitable for transmission inside the mobile terminal, and the second message being of a message type regulated by a current operation system and/or hardware protocol of the mobile terminal;

a transmission unit configured to perform transmission inside the mobile terminal on the second message via an inner transmission channel, and the inner transmission channel being an inner transmission channel provided by the current operation system and/or hardware of the mobile terminal; and a second parsing unit configured to receive the second message transmitted by the transmission unit via the inner transmission channel, and parse the second message, obtain the reason information about failing to access the network included in the second message so as to facilitate the displaying module to display same.

In addition, the information displayed by the displaying module 603 further includes response information of reason information about failing to access the network.

Figure 7:
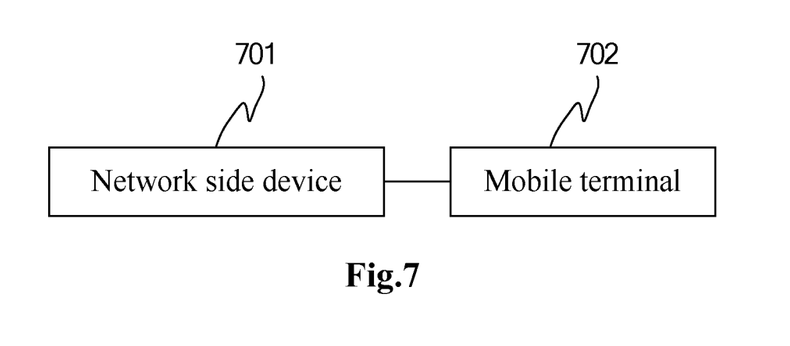
FIG. 7 is a structural schematic diagram of the system for obtaining the error code information provided by an embodiment of the present invention.

An embodiment of the present invention further provides system for obtaining error code information, as shown in FIG. 7, the system may include a network side device 701 and a mobile terminal 702;

the network side device 701 is configured to send a first message to the mobile terminal 702 when the mobile terminal 702 failed to access a network, and the first message includes error code information, and the error code information is used for identifying information about the reason why the mobile terminal 702 failed to access the network.

The mobile terminal 702 is configured to receive the first message sent by the network side device 701, obtain and display the reason information about failing to access the network.

As to the specific operation processes and functional architectures of the mobile terminal in the embodiment, please refer to the description of the method and apparatus for obtaining error code information provided in the above-mentioned embodiment of the present invention.

It can be seen from the above-mentioned that the embodiment of the present invention provides a method, device and system for obtaining error code information: a mobile terminal receives a first message, and the first message is sent to the mobile terminal by a network side after the mobile terminal fails to access a network, and the first message includes error code information used for identifying the reason why the mobile terminal failed to access the network; the mobile terminal obtains and displays the reason why the mobile terminal failed to access the network; thereby being able to quickly and accurately obtain the reason why the mobile terminal failed to access the network, and provide a response prompt to a user, and thereby being able to intelligently and quickly assist the user to interact well with the mobile terminal, and improve the user experience of the mobile terminal.

What mentioned above are merely embodiments of the present invention, and it should be explained that various improvements or modifications can also be made by those skilled in the art within the principle of the disclosure and shall fall within the protection scope of the present invention.

What is claimed is:

1. A method for obtaining error code information, comprising: receiving a first message at a mobile terminal, wherein the first message is sent to the mobile terminal from a network side after the mobile terminal fails to access a network, and the first message includes error code information used for identifying a cause of failure to access the network; parsing error code information in the first message, and obtaining the cause of failure to access the network included in the first message; packaging the cause of failure to access to the network into a second message which is suitable for transmission inside the mobile terminal; transmitting the second message via an inner transmission channel; parsing the second message after inner transmission, and obtaining the cause of failure to access the network included in the second message; and displaying the cause of failure to access the network; wherein the type of the second message complies with a current operation system and/or hardware protocol of the mobile terminal, and the inner transmission channel is provided by the current operation system and/or hardware of the mobile terminal.

2. The method according to claim 1, wherein before the mobile terminal receives the first message and after failing to access the network, the method further comprises: sending a message to the network side to query the cause of failure to access the network.

3. The method according to claim 1, wherein the mobile terminal displaying the cause of failure to access the network comprises:
   displaying a response which can be taken to deal with the network access failure.

4. An apparatus for obtaining error code information, comprising:
   a receiving module, configured to receive a first message, wherein the first message is sent to a mobile terminal from a network side after the mobile terminal fails to access a network, and the first message includes the error code information used for identifying a cause of failure to access the network;
   an obtaining module, configured to obtain the cause of failure to access the network; and
   a displaying module, configured to display the cause of failure to access the network;
   wherein the obtaining module comprises:
   a first parsing unit, configured to parse error code information in the first message and obtain the cause of failure to access the network included in the first message;
   a packaging unit, configured to package the cause of failure into a second message which is suitable for transmission inside the mobile terminal, wherein the message type of the second message comply with a current operation system and/or hardware protocol of the mobile terminal;
   a transmission unit, configured to transmit the second message via an inner transmission channel, wherein the inner transmission channel is provided by the current operation system and/or hardware of the mobile terminal; and
   a second parsing unit, configured to receive the second message transmitted by the transmission unit via the inner transmission channel, and parse the second message to obtain the cause of failure to access the network included in the second message so as to facilitate the displaying module to display the cause of failure.

5. The apparatus according to claim 4, wherein the apparatus further comprises:
   a query module, configured to, after failing to access the network, send a message to a network side to query the cause of failure to access the network.

6. The apparatus according to claim 4, wherein information displayed by the displaying module further comprises a response which can be taken to deal with the network access failure.

7. A system for obtaining error code information, comprising a network side device and a mobile terminal;
   the network side device, configured to send a first message to the mobile terminal when the mobile terminal failed to access a network, wherein the first message includes error code information used for identifying a cause of failure to access the network; and
   the mobile terminal, configured to receive the first message, obtain and display the cause of failure to access the network;
   the mobile terminal is further configured to perform the following operations:
   the mobile terminal parses error code information in the first message, and obtains the cause of failure to access the network included in the first message;
   the mobile terminal packages the cause of failure to access to the network into a second message which is suitable for transmission inside the mobile terminal;
   the mobile terminal transmits the second message via an inner transmission channel; and
   the mobile terminal parses the second message after inner transmission, and obtains the cause of failure to access the network included in the second message;
   wherein the type of the second message complies with a current operation system and/or hardware protocol of the mobile terminal, and the inner transmission channel is provided by the current operation system and/or hardware of the mobile terminal.

* * * * *